(12) United States Patent
Nishiyama et al.

(10) Patent No.: US 8,753,469 B2
(45) Date of Patent: Jun. 17, 2014

(54) METHOD OF VACUUM-ASSISTED RTM

(75) Inventors: Shigeru Nishiyama, Aichi (JP);
Fumihito Takeda, Aichi (JP); Hiroshi Odani, Ehime (JP); Masumi Mizobata, Ehime (JP)

(73) Assignees: Toray Industries, Inc. (JP); Mitsubishi Heavy Industries, Ltd. (JP)

( * ) Notice: Subject to any disclaimer, the term of this patent is extended or adjusted under 35 U.S.C. 154(b) by 740 days.

(21) Appl. No.: 12/531,724

(22) PCT Filed: Mar. 19, 2008

(86) PCT No.: PCT/JP2008/055039
§ 371 (c)(1),
(2), (4) Date: Sep. 17, 2009

(87) PCT Pub. No.: WO2008/114809
PCT Pub. Date: Sep. 25, 2008

(65) Prior Publication Data
US 2010/0108245 A1 May 6, 2010

(30) Foreign Application Priority Data
Mar. 20, 2007 (JP) ................. 2007-072069

(51) Int. Cl.
*B29C 47/06* (2006.01)
*B29C 65/00* (2006.01)
*B29C 53/80* (2006.01)
*B65H 81/00* (2006.01)
*B44C 3/08* (2006.01)
*B44C 5/04* (2006.01)
*B29C 47/00* (2006.01)
*B32B 7/04* (2006.01)
*B32B 37/00* (2006.01)
*B29C 45/00* (2006.01)
*B29C 43/10* (2006.01)
*B29C 49/00* (2006.01)
*B29C 47/76* (2006.01)
*B29C 67/00* (2006.01)
*B29C 70/44* (2006.01)
*B28B 7/30* (2006.01)
*D21J 3/00* (2006.01)
*B29C 39/02* (2006.01)
*B29C 43/02* (2006.01)
*B29C 49/08* (2006.01)
*B29D 22/00* (2006.01)

(52) U.S. Cl.
USPC ........... 156/243; 156/285; 156/286; 156/169; 156/220; 156/244.24; 156/91; 156/87; 156/382; 156/500; 264/511; 264/571; 264/101; 264/102; 264/136; 264/137; 264/527; 264/258; 264/313; 264/324; 264/510; 264/512

(58) Field of Classification Search
USPC ........ 156/243, 169, 220, 244.24, 91, 87, 286, 156/382, 500; 264/511, 571, 101, 102, 136, 264/137, 527, 258, 313, 324, 510, 512
See application file for complete search history.

(56) References Cited

U.S. PATENT DOCUMENTS

| | | | | |
|---|---|---|---|---|
| 5,052,906 A | * | 10/1991 | Seemann | 425/112 |
| 2006/0125155 A1 | * | 6/2006 | Sekido et al. | 264/511 |
| 2007/0149080 A1 | * | 6/2007 | Asahara et al. | 442/239 |

FOREIGN PATENT DOCUMENTS

| | | | |
|---|---|---|---|
| EP | 1 731 282 A1 | 12/2006 | |
| JP | 2002-192535 A | 7/2002 | |
| JP | 2003-011136 A | 1/2003 | |
| JP | 2003-025347 A | 1/2003 | |
| JP | 2003-039455 A | 2/2003 | |
| JP | 2004-188750 A | 7/2004 | |
| JP | 2004-249527 A | 9/2004 | |
| JP | 2006-159457 A | 6/2006 | |
| JP | 2007-015203 A | 1/2007 | |
| WO | 2005/095079 A1 | 10/2005 | |

* cited by examiner

*Primary Examiner* — Thomas Dunn
*Assistant Examiner* — Matthew Hoover

(74) *Attorney, Agent, or Firm* — DLA Piper LLP (US)

(57) ABSTRACT

A method of vacuum-assisted RTM includes disposing a resin distribution medium on one surface of a reinforcing-fiber substrate, covering the whole with a bag material, reducing the pressure inside the bag material, and injecting a resin into the resin distribution medium to distribute the resin substantially in in-plane directions and then impregnate the resin into the reinforcing-fiber substrate in the thickness direction. The method is characterized in that the flow resistance of the resin distribution medium itself during resin distribution is changed in in-plane directions of the reinforcing-fiber substrate, in accordance with a difference in fiber weight per unit area or density between parts to be impregnated with resin of the reinforcing-fiber substrate present in a plane direction of the reinforcing-fiber substrate, or in accordance with a difference in distance from a resin impregnation initiation part to a resin impregnation completion part between parts to be impregnated with resin of the reinforcing-fiber substrate present in a plane direction of the reinforcing-fiber substrate.

12 Claims, 3 Drawing Sheets

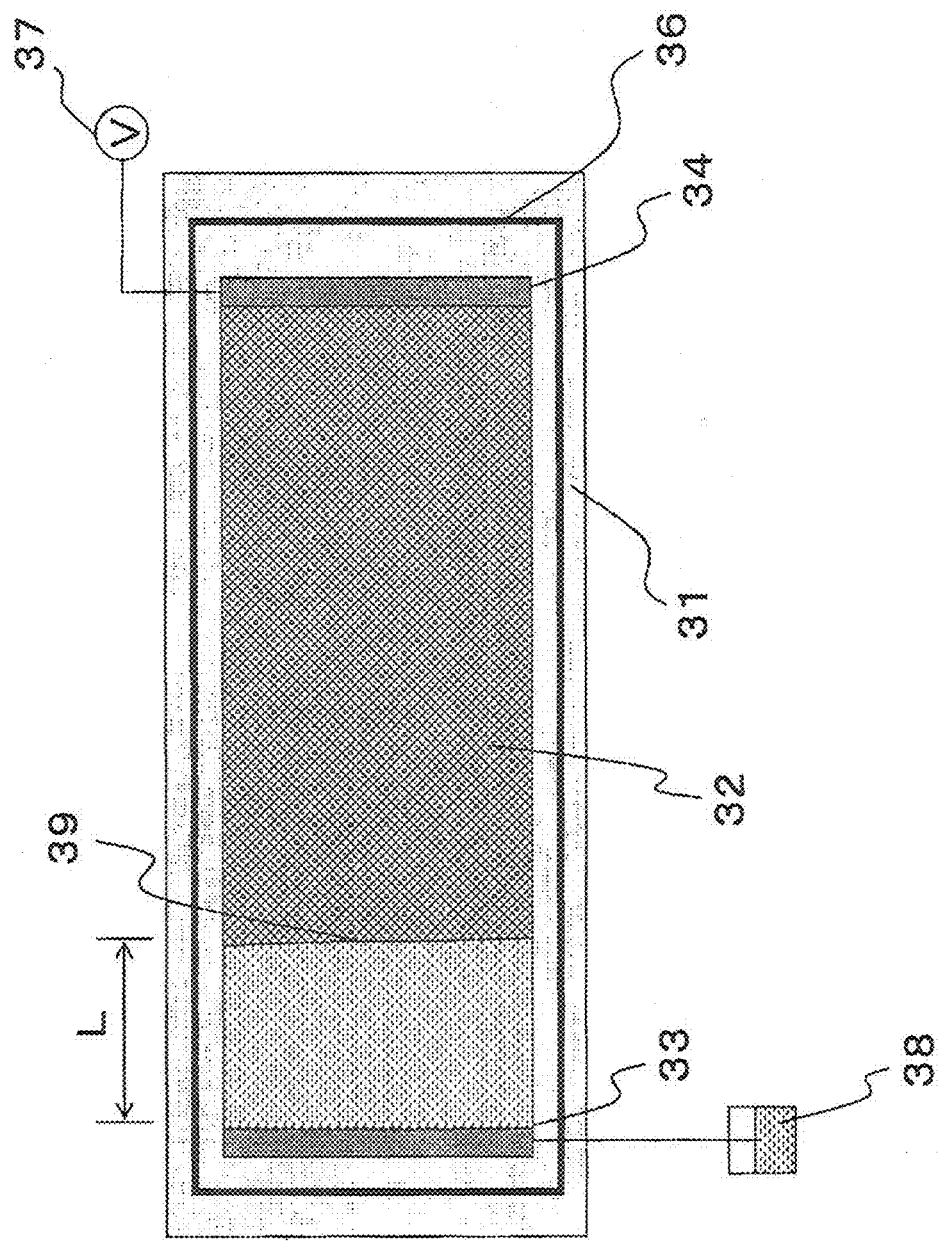

METHOD OF VACUUM-ASSISTED RTM

RELATED APPLICATIONS

This is a §371 of International Application No. PCT/JP2008/055039, with an international filing date of Mar. 19, 2008 (WO 2008/114809 A1, published Sep. 25, 2008), which is based on Japanese Patent Application No. 2007-072069, filed Mar. 20, 2007.

TECHNICAL FIELD

This disclosure relates to a method of vacuum-assisted RTM (Resin Transfer Molding) and, specifically, to a method of vacuum-assisted RTM capable of impregnating a resin uniformly over the entire reinforcing-fiber substrate and stably obtaining a fiber reinforced plastic (FRP) molded product excellent in quality.

BACKGROUND

A method of vacuum-assisted RTM is known which disposes a resin distribution medium over the whole of one surface of a reinforcing-fiber substrate (usually, a reinforcing-fiber substrate formed as a preform), covers the whole with a bag material to reduce the pressure inside the bag material, injects a resin toward the resin distribution medium, first, distributes the injected resin substantially in in-plane directions of the resin distribution medium and, thereafter, impregnates the resin into the reinforcing-fiber substrate in its thickness direction. In such a method of vacuum-assisted RTM, in a case where the resin flowability of the preform is nonuniform, because there occurs a difference between times for flow of the resin in the preform being impregnated into the preform, a problem may occur that a non-impregnated part is generated, or that a previously impregnated resin interrupts a suction route between a pressure-reduced suction port and the preform, and a following resin impregnation is impaired. For example, in a case where parts different in thickness exist in the preform, or in a case where parts different in length or width to be impregnated with resin (parts different in resin impregnation length) exist in the lengthwise direction of the preform, because there occurs a difference between times for flow of the resin in the preform depending upon these parts, a problem may occur that a non-impregnated part is generated, or that a previously impregnated resin impairs a following resin impregnation.

To increase the resin distribution property due to the resin distribution medium and improve the surface property of a molded product in the method of vacuum-assisted RTM, although a technology is known for increasing the number of disposed resin distribution media (for example, JP-A-2004-188750), by merely increasing the number of resin distribution media over the entire surface, although the inner flowability of the resin distribution medium itself can be improved, the above-described problems cannot be solved in a case where there is a change in resin flowability of reinforcing-fiber substrate when the resin is impregnated from the resin distribution medium into the reinforcing-fiber substrate. Further, because a large amount of resin is distributed at the part of resin distribution medium, waste of resin may become great.

Further, although a method is also proposed for providing many resin injection ports when a large-sized plane material is molded by vacuum-assisted RTM (for example, JP-A-2003-011136), even if the resin impregnation into a resin distribution medium is improved, the aforementioned problems cannot be solved in a case where there is a change in resin flowability of reinforcing-fiber substrate when the resin is impregnated from the resin distribution medium into the reinforcing-fiber substrate.

Furthermore, although a technology is also proposed for using a net-like stereo structured resin distribution medium (for example, JP-A-2004-249527), it does not describe as to a solution for the problem due to a change in resin flowability of reinforcing-fiber substrate.

Accordingly, it could be helpful to provide a method of vacuum-assisted RTM, in a case where there is a change in resin flowability in in-plane directions of a reinforcing-fiber substrate, which can absorb the change by the side of a resin distribution medium, and with respect to a resin-impregnated reinforcing-fiber substrate becoming a product or a main structural part of a product, which can prevent a problem that a non-impregnated part is generated or a problem that a previously impregnated resin impairs a following resin impregnation from occurring, and can stably obtain a desired molded product surely.

SUMMARY

A method of vacuum-assisted RTM for disposing a resin distribution medium on one surface of a reinforcing-fiber substrate, covering the whole with a bag material, reducing a pressure inside the bag material, injecting a resin into the resin distribution medium to distribute the resin substantially in in-plane directions and then impregnate the resin into the reinforcing-fiber substrate in its thickness direction, and is characterized in that a flow resistance of the resin distribution medium itself during resin distribution is changed in an in-plane direction of the reinforcing-fiber substrate, in accordance with a difference in fiber weight per unit area or density between parts to be impregnated with resin of the reinforcing-fiber substrate present in a direction along the one surface of the reinforcing-fiber substrate, or in accordance with a difference in distance from a resin impregnation initiation part to a resin impregnation completion part between parts to be impregnated with resin of the reinforcing-fiber substrate present in a direction along the one surface of the reinforcing-fiber substrate. The flow resistance can be determined by the method described later.

Namely, by changing the flow resistance of the resin distribution medium itself during resin distribution in accordance with a change of resin flowability in in-plane directions of the reinforcing-fiber substrate side, in particular, a change of resin flowability due to a difference (change) in fiber weight per unit area or density between respective parts to be impregnated with resin of the reinforcing-fiber substrate present in a direction along the surface of the reinforcing-fiber substrate disposed thereon with the resin distribution medium or in accordance with a change of resin flowability due to a difference (change) in distance from a resin impregnation initiation part to a resin impregnation completion part between respective parts to be impregnated with resin of the reinforcing-fiber substrate present in a direction along the surface of the reinforcing-fiber substrate disposed thereon with the resin distribution medium, the change of resin flowability of the reinforcing-fiber substrate side is absorbed (adjusted) by the resin distribution medium side. As a result, in the respective parts to be impregnated with resin of the reinforcing-fiber substrate, the time for the resin to reach from the resin impregnation initiation part from the resin distribution medium to the resin impregnation completion part through the flow in the reinforcing-fiber substrate can be uniformized, and for the reinforcing-fiber substrate, it can be prevented to generate a problem that a non-impregnated part is generated or a problem that a previously impregnated resin impairs a following resin impregnation. Therefore, a molded product impregnated with resin uniformly over the entire reinforcing-fiber substrate can be obtained.

In the above-described method of vacuum-assisted RTM, a method can be employed wherein the resin distribution medium is formed by stacking a plurality of resin distribution media, and the flow resistance is changed by changing the number of stacked resin distribution media in an in-plane direction of the reinforcing-fiber substrate. Alternatively, a method can also be employed wherein the flow resistance is changed by changing a porosity (an amount of pores) of the resin distribution medium in an in-plane direction of the reinforcing-fiber substrate (namely, changing a bulk density of the resin distribution medium in the in-plane direction).

In this method of vacuum-assisted RTM, it is preferred that a difference of 1.2 times or more is given between a maximum value and a minimum value of the flow resistance, and by this, an explicit significant difference can be given relatively to a conventional technology, and it can be clearly distinguished from a simple error on manufacture of a resin distribution medium (a dispersion of thickness or the like)

Thus, in the method of vacuum-assisted RTM, the change of resin flowability of the reinforcing-fiber substrate side can be adequately absorbed by the resin distribution medium side. Therefore, the method is effective for a case where a thickness of the reinforcing-fiber substrate changes in an in-plane direction of the reinforcing-fiber substrate or a case where a density of the reinforcing-fiber substrate changes in an in-plane direction of the reinforcing-fiber substrate.

In the above-described method, in a case where a maximum value of the thickness of the reinforcing-fiber substrate is 1.5 times or more of a minimum value of the thickness thereof, because a difference in time required for completely impregnating resin in the thickness direction of the reinforcing-fiber substrate between the maximum thickness and the minimum thickness becomes clearly great, the effect becomes clearer.

Further, in a case where the reinforcing-fiber substrate is a unidirectional woven fabric formed from a reinforcing-fiber yarn group comprising carbon fibers and an auxiliary-fiber yarn group extending in a direction across the reinforcing-fiber yarn group, because the carbon fibers have a thin single-fiber diameter and the unidirectional woven fabric has a formation in which the gap between reinforcing-fiber yarns is small, the resin impregnation speed in the thickness direction of the reinforcing-fiber substrate is low, and the effect becomes clearer.

Furthermore, the method of vacuum-assisted RTM is also effective, for example, for a case where the resin is injected into the resin distribution medium via a resin injection line, and a length of the reinforcing-fiber substrate in a direction perpendicular to the resin injection line changes in an in-plane direction of the reinforcing-fiber substrate.

We also provide a method for producing a fiber-reinforced plastic molded product having a process for impregnating a resin into a reinforcing-fiber substrate by the above-described method of vacuum-assisted RTM.

In the method of vacuum-assisted RTM, in a case where there is a change in resin flowability in in-plane directions of the reinforcing-fiber substrate side, since it can be absorbed by changing the flow resistance of the resin distribution medium itself during resin distribution in an in-plane direction of the reinforcing-fiber substrate in accordance with the change in resin flowability, it becomes possible to uniformize the time for the resin to reach from the resin impregnation initiation part into the reinforcing-fiber substrate to the resin impregnation completion part through the flow in the reinforcing-fiber substrate over the entire reinforcing-fiber substrate, and it becomes possible to prevent a problem that a non-impregnated part is generated or a problem that a previously impregnated resin impairs a following resin impregnation from occurring and to obtain a molded product uniform in quality without defects even for a product with change in thickness or with change in width.

BRIEF DESCRIPTION OF THE DRAWINGS

FIG. 5 is a schematic plan view of the measurement device depicted in FIG. 4.

EXPLANATION OF SYMBOLS

Figure 1:
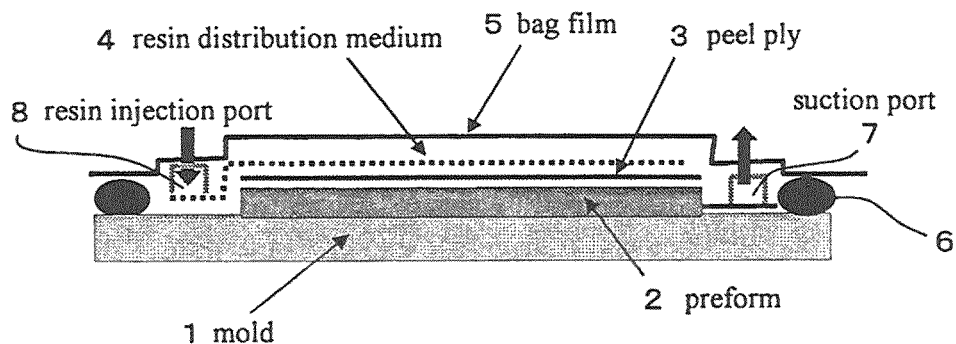
FIG. 1 is a schematic diagram showing an example of a method of vacuum-assisted RTM applied with this disclosure.

1: mold
2: preform of reinforcing-fiber substrate
3: peel ply
4: resin distribution medium
5: bag film as bag material
6: seal member
7: suction port
8: resin injection port
11: preform of reinforcing-fiber substrate
12: resin distribution medium
13: suction port
14: resin injection port
21: preform of reinforcing-fiber substrate
22: resin injection line
23: pressure-reduced suction line

DETAILED DESCRIPTION

Aspects of this disclosure will be explained referring to the figures.

The method of vacuum-assisted RTM is carried out, for example, as shown in FIG. 1. In the method shown in FIG. 1, a preform 2 prepared by forming a reinforcing-fiber substrate in a predetermined shape is placed on a mold 1, and on one surface thereof over the entire surface, a resin distribution medium 4 is disposed via a peel ply 3. For the resin distribution medium 4, a material lower in resin flow resistance than the reinforcing-fiber substrate is selected. The whole thereof is covered with a bag film 5 prepared as a bag material, and the circumference is sealed via a seal member 6. The inside covered with the bag film 5 is reduced in pressure by vacuum suction through a suction port 7, and after the pressure reduction, a resin is injected through a resin injection port 8. The injected resin, first, is distributed in in-plane directions of resin distribution medium 4 comprising substantially a material low in flow resistance and, thereafter, is impregnated from the resin distribution medium 4 into the preform 2 of reinforcing-fiber substrate in the thickness direction. Of course, although a small amount of resin is impregnated into preform 2 even during the distribution in the resin distribution medium 4, because the distribution speed in the resin distribution medium 4 is much higher as compared with the impregnation speed into the preform 2, the resin flow becomes substantially such a formation.

Figure 2:
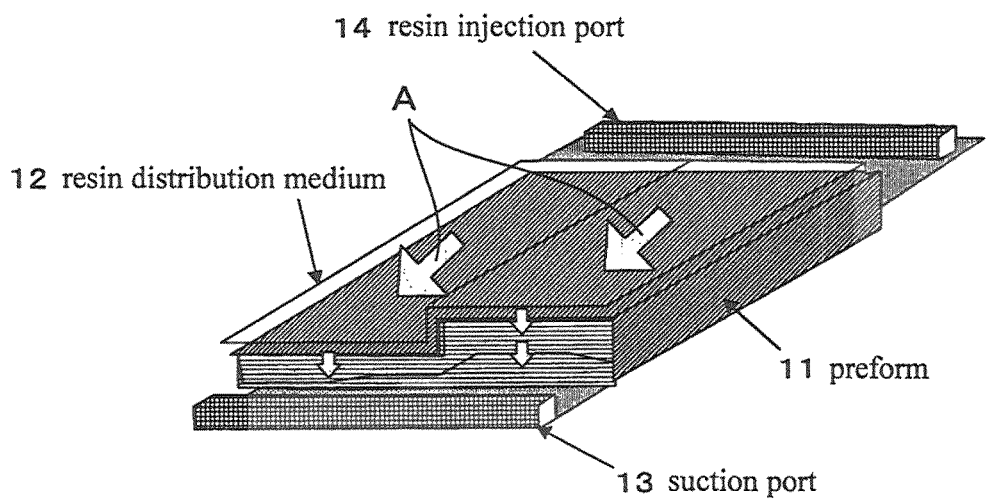
FIG. 2 is a partial perspective view of a preform of reinforcing-fiber substrate and a resin distribution medium showing an example of an object to be applied with a method of vacuum-assisted RTM.

In such a vacuum-assisted RTM, the aforementioned problems occur in a case where there is a change in resin flow resistance in an in-plane direction in the preform of reinforcing-fiber substrate. For example, as shown in FIG. 2, in a case where a change in thickness, therefore, a change in fiber weight per unit area, is present in preform 11 in a direction along the surface disposed with resin distribution medium 12, for example, when the resin is distributed in resin distribution medium 12 in the arrow A direction from resin injection port 11 side toward suction port 13 side and the distributed resin is impregnated into preform 11, because there is a difference in thickness between the respective resin impregnation parts, occurs a dispersion in time required for the resin to be impregnated over the entire thickness in each resin impregnation part. Namely, the time for impregnation becomes long in a thick part, and the time becomes short in a thin part and the impregnation is completed early. Therefore, in a thick part, a non-impregnation part is liable to occur. Further, because the resin is impregnated early in a thin part, there is a possibility that the impregnated resin interrupts the suction route between suction port 13 and preform 11 and it impairs the resin impregnation in a thick part.

In accordance with this change of resin flowability originating from the change in thickness of the side of preform 11 of reinforcing-fiber substrate, the flow resistance of resin distribution medium 12 itself during resin distribution is changed in an in-plane direction of preform 11. Namely, a resin distribution medium high in flowability is disposed for a part requiring a long resin impregnation time, and a resin distribution medium low in flowability is disposed for a part with a short resin impregnation time. Concretely, for example, for a part of preform 11 with a large thickness, a resin distribution medium high in flowability is configured by increasing the stacking number of the resin distribution media, and for a part of preform 11 with a small thickness, a resin distribution medium low in flowability is configured by decreasing the stacking number of the resin distribution media. By such a structure, it becomes possible to uniformize the resin impregnation completion times between the thick part and the thin part of preform 11, and it becomes possible to solve the above-described problems. In this case, instead of the above-described change of stacking number, or together with the above-described change of stacking number, the change in flow resistance of resin distribution medium 12 may be achieved by changing the porosity of resin distribution medium 12.

As shown in FIG. 2, in a case where there is a difference in thickness in preform 11 in a direction across the resin distribution direction in resin distribution medium 12 shown by arrows A, although the flow resistance during the resin distribution of resin distribution medium 12 itself is changed in correspondence with the thick part and the thin part of preform 11, for example, even in a case where resin injection port 14 is provided in the right side in FIG. 2, suction port 13 is provided in the left side in FIG. 2 and the resin is distributed in resin distribution medium 12 in a direction perpendicular to the arrow A direction from the right side toward the left side in FIG. 2, by a structure wherein a resin distribution medium high in flowability is configured for a part of preform 11 with a large thickness by increasing the stacking number of the resin distribution media, and a resin distribution medium low in flowability is configured for a part of preform 11 with a small thickness by decreasing the stacking number of the resin distribution media, it becomes possible to uniformize the resin impregnation completion times between the thick part and the thin part of preform 11.

In a case where a maximum value of the thickness of preform 11 is 1.5 times or more of a minimum value thereof, because a difference in time required for completely impregnating resin in the thickness direction of the reinforcing-fiber substrate between the maximum thickness and the minimum thickness becomes theoretically 2 times or more, if employed is a resin distribution medium uniform in flow resistance during resin distribution, the resin is impregnated early in the part of the minimum thickness and, therefore, there is a possibility that the impregnated resin interrupts the suction route between suction port 13 and preform 11 and it impairs the resin impregnation at the part of the maximum thickness. However, such a fear of impairing the resin impregnation can be removed by changing the flow resistance during resin distribution of resin distribution medium 12 itself in accordance with the change in thickness of preform 11 as described above. Therefore, in a case where a maximum value of the thickness of preform 11 is 1.5 times or more of a minimum value thereof, the effect becomes clearer. Furthermore, in a case where the maximum thickness of preform 11 is 5 mm or more, because the time required for completely impregnating resin in the thickness direction of preform 11 becomes long, the effect becomes clearer.

Further, although the kind of the reinforcing fibers and the formation of the substrate for the preform is not particularly restricted, in a case of a preform poor in resin impregnation property, because the time required for completely impregnating resin in the thickness direction of the preform becomes long, the effect becomes clearer. With respect to reinforcing fibers, carbon fibers with a small single-fiber diameter are poor in resin permeation property, and with respect to the formation of reinforcing-fiber substrate, because a unidirectional woven fabric is small in gaps between reinforcing fiber yarns and the resin permeation property is poor, for example, as compared with bidirectional woven fabric, the effect becomes clearer.

Further, even in a case where the resin impregnation time of preform 11 of rein-forcing-fiber substrate changes not by changes in thickness but by changes in density of rein-forcing-fiber substrate forming preform 11 (for example, even in a case where the stacking structure of the reinforcing-fiber substrate forming preform 11 or the kind of the substrate changes), similarly to that described above, by changing the flow resistance of resin distribution medium 12 side, it becomes possible to uniformize the resin impregnation completion time over the whole of preform 11.

Figure 3:
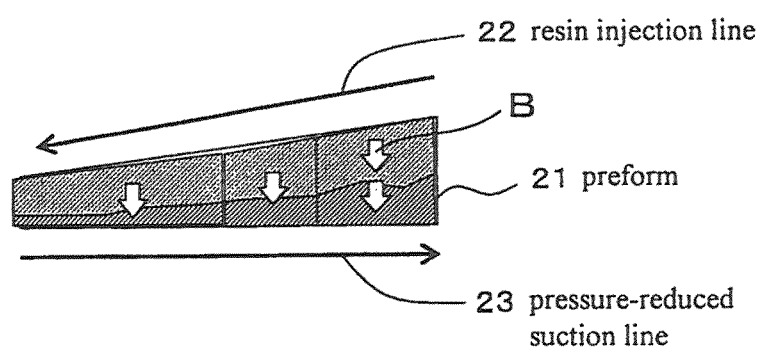
FIG. 3 is a plan view of a preform of reinforcing-fiber substrate showing another example of an object to be applied with a method of vacuum-assisted RTM.

Furthermore, as shown as a plan view in FIG. 3 with a case of preform 21 of reinforcing-fiber substrate, in a case where the length in a resin flow direction shown by arrows B changes in the lengthwise direction of preform 21, in the example shown in the figure, the resin is injected into a resin distribution medium (not shown, disposed at an upper side of preform 21) via resin injection line 22 (symbol 23 shows a pressure-reduced suction line), also in a case where the length of preform 21 comprising reinforcing-fiber substrate in a direction perpendicular relative to the resin injection line 22 changes in an in-plane direction of the preform 21, because the length in the flow direction of resin is non-uniform in the lengthwise direction of preform 21, in a case where a resin distribution medium is the same over the entire surface, the resin is impregnated more quickly at a part with a shorter flow distance and, therefore, by the same reason as described above, there is a possibility that the previously impregnated resin impairs the successive resin impregnation.

However, by changing the flow resistance of the resin distribution medium itself during resin distribution in accordance with a change of resin flowability due to a difference in distance from a resin impregnation initiation part to a resin impregnation completion part between respective parts to be impregnated with resin of the reinforcing-fiber substrate present in a direction along the surface of the reinforcing-fiber substrate disposed thereon with the resin distribution medium, the change of resin flowability of the reinforcing-fiber substrate side can be absorbed by the resin distribution medium side, Namely, as shown in FIG. 3, by changing the flow resistance of the resin distribution medium side in accordance with the change in length of flow distance in the lengthwise direction of preform 21, it becomes possible to uniformize the resin impregnation completion time over the whole of preform 21. Namely, by disposing a resin distribution medium high in flowability (low in flow resistance) for a part of preform 21 with a long flow distance in the lengthwise direction of preform 21, and by disposing a resin distribution medium low in flow-ability (high in flow resistance) for a part of preform 21 with a short flow distance, it becomes possible to uniformize the resin impregnation completion time over the whole of preform 21.

Figure 4:
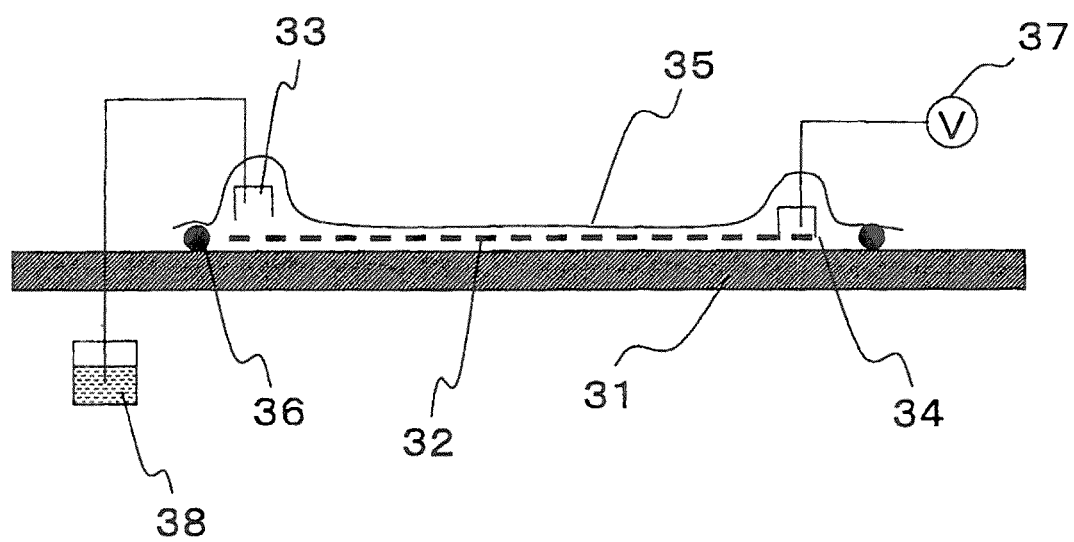
FIG. 4 is a schematic diagram of a measurement device showing a method for determining a flow resistance of a resin distribution medium in a method of vacuum-assisted RTM.

The above-described flow resistance of resin distribution medium in the method of vacuum-assisted RTM can be determined by the following method. Namely, the flow resistance R represents a quantity of a resistance of a medium when a resin is flowed through a resin distribution medium, and it can be measured by flowing a liquid in the medium under a pressure-reduced condition. In the determination of the flow resistance R, as shown in FIGS. 4 and 5, a resin distribution medium 32 with a width of 150 mm and an arbitrary length (about 1,000 mm) is disposed on a metal mold 31, an injection port 33 is placed on one side and a pressure reduction port 34 is placed on the other side, the whole thereof is covered with a bag material 35 and the circumference is sealed by a seal member 36, the inside of the bag material 35 is sucked by a vacuum pump 37 to reduce the pressure down to 5 torr or lower, a liquid 38 with a viscosity μ (a resin with no change in viscosity, etc.) is injected from injection port 33, and the liquid 38 is distributed in the resin distribution medium 32. After liquid 38 is flowed into resin distribution medium 32 for a predetermined time of T seconds, a distance L from injection port 33 to a flow front 39 (FIG. 5) of the liquid is measured. It is meant that the longer this distance L is, the higher the flowability of resin distribution medium 32 is, namely, the lower the flow resistance is.

Quantitatively, the flow resistance R is defined as shown in the following equations (1) and (2):

$$L = \sqrt{(2 \cdot K \cdot T \cdot P / \mu)} \quad (1)$$

$$R = \sqrt{(1/K)} \quad (2)$$

where,
T: predetermined time (sec.)
L: distance flowed with resin for the predetermined time (mm)
K: coefficient for flow (mm$^2$)
μ: viscosity of liquid (Pa·sec.)
P: difference in pressure between inside of bag material and resin pressure
R: flow resistance (mm$^{-1}$).

As described hereinabove, by changing the flowability of the resin distribution medium in a in-plane direction, concretely, by early distributing resin partially by disposing a resin distribution medium high in flowability at a part with a large thickness, a part with a great flow resistance of preform or a part with a long flow distance, the time for resin to impregnate into the whole of preform becomes uniform, and the quality of a molded product can be stabilized. Further, without interruption of a suction route by resin, the resin can be impregnated into the whole of the preform surely.

Examples

Example 1

A multiaxial woven fabric (produced by Toray Industries, Inc., type: MK8260-JN, fiber weight per unit area per one layer: 300 g/m$^2$) prepared by stitching two layers of unidirectional reinforcing fiber layers each formed with carbon fibers T700S (PAN-system carbon fibers) produced by Toray Industries, Inc. was cut at 8 sheets each with a width of 400 mm and a length of 800 mm and, further, cut at 8 sheets each with a width of 400 mm and a length of 400 mm. Next, after 8 sheets of carbon fiber woven fabrics each with a size of 400 mm×800 mm were stacked on a metal mold, 8 sheets of carbon fiber woven fabrics each with a size of 400 mm×400 mm were stacked to prepare a reinforcing-fiber preform 11 present with parts having thicknesses different from each other, as shown in FIG. 2.

Next, as the resin distribution medium 12, two polypropylene mesh materials (TSX-400P, produced by Tokyo Polymer Corporation), one of which had a size of a width 400 mm and a length of 800 mm and the other of which had a size of a width 400 mm and a length of 400 mm, were prepared.

Next, as shown in FIG. 1, the above-described reinforcing-fiber preform 2 (reinforcing-fiber preform 11 in FIG. 2) was placed on flat plate-like steel mold 1 so that the thickness changed in the same direction as suction port 7, and after the resin distribution medium 4 with a width 400 mm and a length of 800 mm (resin distribution medium 12 in FIG. 2) was placed on the entire upper surface thereof, a resin distribution medium with a width 400 mm and a length of 400 mm was further placed on the thick part (the part stacked with 16 sheets of carbon fiber woven fabrics).

Next, after resin injection port 8 and suction port 7 were disposed, the whole of reinforcing-fiber preform 2 was covered with bag film 5 (a nylon film), the circumference was closed by sealant 6 (SM5126, produced by Richmond Corporation), and the inside of bag film 5 was reduced in pressure by a vacuum pump communicated with suction port 7.

Next, the whole of the molding device was placed under an atmosphere at 20° C., a thermosetting vinylester resin (viscosity: 200 mPa·s, R-7070, produced by Showa Polymer Corporation) was prepared, and resin injection was started from injection port 8. The resin was distributed in resin distribution medium 12 with a speed difference, after 2 minutes from the start of injection, the resin distribution was completed in advance at the part stacked with two sheets of resin distribution media (at a surface of the thick part of the reinforcing-fiber preform), and after 4 minutes from the start of injection, the resin was distributed in the whole of the resin distribution medium. Furthermore, the resin was impregnated from the resin distribution medium into the preform, after 8 minutes from the start of injection, the resin was impregnated into the whole of the reinforcing-fiber preform, and the resin flowed out from the whole of the reinforcing-fiber preform 11 simultaneously.

Finally, the resin injection was stopped, the resin was cured, and a fiber reinforced plastic molded product was taken out from the metal mold. As the result of inspection of the appearance of the molded product, a resin non-impregnated part was not present on the surface and, further, as the result of inspecting defects in the interior of the FRP molded product by ultrasonic detector (EPOCH4, produced by Panametrics Corporation), an echo from a bottom surface was recognized over the entire FRP surface, and a fiber reinforced plastic molded product excellent in quality, in which there was no resin non-impregnated part over the entire FRP, could be obtained.

Comparative Example 1

In a manner similar to that in Example 1, the reinforcing-fiber preform 11, in which there were parts different in thickness from each other as shown in FIG. 2, was prepared. Next, as the resin distribution medium 12, a sheet of polypropylene mesh material (TSX-400P, produced by Tokyo Polymer Corporation) having a size of a width 400 mm and a length of 800 mm was prepared.

As shown in FIG. 1, the above-described reinforcing-fiber preform 2 (11) was placed on flat plate-like steel mold 1 so that the thickness changed in the same direction as the extending direction of suction port 7, and on the entire upper surface thereof the resin distribution medium 4 (12) with a width 400 mm and a length of 800 mm was placed by only one sheet.

Next, the molding device was structured in the same manner as that in Example 1, and resin injection was started. The resin was distributed in the resin distribution Medium at a same speed, and after 4 minutes from the start of injection, the resin was distributed over the entire surface of the resin distribution medium. The resin was impregnated from the resin distribution medium into the preform, after 8 minutes from the start of injection, the resin flowed out from the thin part of the reinforcing-fiber substrate into the suction port, and a state was appeared wherein the flowed-out resin interrupted the suction route between the suction port 7 and the thick part of the preform.

The resin injection was stopped after 30 minutes from the start of injection, the resin was cured, and a fiber reinforced plastic molded product was taken out from the metal mold. As the result of inspection of the appearance of the molded product, a resin non-impregnated part was recognized on the surface of the molded product side at the thick-plate part of the fiber reinforced plastic molded product.

INDUSTRIAL APPLICABILITY

This disclosure can be applied to any vacuum-assisted RTM, and in particular, it is suitable for molding of a molded product with a complicated shape or a molded product varying in width, etc.

The invention claimed is:
1. A method of vacuum-assisted RTM for disposing a resin distribution medium on one surface of a reinforcing-fiber substrate comprising:
covering the resin distribution medium with a bag material;
reducing pressure inside said bag material;
injecting a resin into said resin distribution medium to distribute said resin; and
impregnating said resin into said reinforcing-fiber substrate in its thickness direction such that flow resistance of said resin distribution medium during resin distribution varies along an in-plane direction of said resin distribution medium in accordance with a difference in fiber weight per unit area or density between parts to be impregnated with resin of said reinforcing-fiber substrate present in a direction along said one surface of said reinforcing-fiber substrate, wherein a portion of the resin distribution medium higher in flowability is disposed adjacent a portion of the reinforcing-fiber substrate having a higher fiber weight per unit area or density and a portion of the resin distribution medium lower in flowability is disposed adjacent a portion of the reinforcing-fiber substrate having a lower fiber weight per unit area or density.

2. The method according to claim 1, wherein said resin distribution medium is formed by stacking a plurality of resin distribution media, and said flow resistance is changed by changing the number of stacked resin distribution media in an in-plane direction of said reinforcing-fiber substrate.

3. The method according to claim 1, wherein said flow resistance is changed by changing porosity of said resin distribution medium in an in-plane direction of said reinforcing-fiber substrate.

4. The method according to claim 1, wherein a difference between a maximum value and a minimum value of said flow resistance is 1.2 times or more.

5. The method according to claim 1, wherein thickness of said reinforcing-fiber substrate changes in an in-plane direction of said reinforcing-fiber substrate.

6. The method according to claim 5, wherein a maximum value of said thickness of said reinforcing-fiber substrate is 1.5 times or more of a minimum value of said thickness.

7. The method according to claim 1, wherein density of said reinforcing-fiber substrate changes in an in-plane direction of said reinforcing-fiber substrate.

8. The method according to claim 1, wherein said reinforcing-fiber substrate is a unidirectional woven fabric formed from a reinforcing-fiber yarn group comprising carbon fibers and an auxiliary-fiber yarn group extending in a direction across said reinforcing-fiber yarn group.

9. The method according to claim 1, wherein said resin is injected into said resin distribution medium via a resin injection line, and length of said reinforcing-fiber substrate in a direction perpendicular to said resin injection line changes in an in-plane direction of said reinforcing-fiber substrate.

10. A method for producing a fiber-reinforced plastic molded product having a process for impregnating a resin into a reinforcing-fiber substrate by the method according to claim 1.

11. A method of vacuum-assisted RTM for disposing a resin distribution medium on one surface of a reinforcing-fiber substrate comprising:
covering the resin distribution medium with a bag material;
reducing pressure inside said bag material;
injecting a resin into said resin distribution medium to distribute said resin through solid resin distribution medium along in-plane directions; and
impregnating said resin into said reinforcing-fiber substrate in its thickness direction such that flow resistance of said resin distribution medium during resin distribution varies along an in-plane direction of said resin distribution medium in accordance with a difference in fiber weight per unit area or density between parts to be impregnated with resin of said reinforcing-fiber substrate present in a direction along said one surface of said reinforcing-fiber substrate, wherein a portion of the resin distribution medium higher in flowability is disposed adjacent a portion of the reinforcing-fiber substrate having a higher fiber weight per unit area or density and a portion of the resin distribution medium lower in flowability is disposed adjacent a portion of the reinforcing-fiber substrate having a lower fiber weight per unit area or density, or in accordance with a difference in distance from a resin impregnation initiation part to a resin impregnation completion part between parts to be impregnated with resin of said reinforcing-fiber substrate present in a direction along said one surface of said reinforcing-fiber substrate wherein a portion of the resin distribution medium higher in flowability is disposed adjacent a portion of the reinforcing-fiber substrate having a longer length of flow distance and a portion of the resin distribution medium lower in flowability is disposed adjacent a portion of the reinforcing-fiber substrate having a shorter length of flow distance.

12. A method of vacuum-assisted RTM for disposing a resin distribution medium on one surface of a reinforcing-fiber substrate comprising:

covering the resin distribution medium with a bag material;

reducing pressure inside said bag material;

injecting a resin into said resin distribution medium to distribute said resin; and impregnating said resin into said reinforcing-fiber substrate in its thickness direction such that flow resistance of said resin distribution medium during resin distribution varies along an in-plane direction of said resin distribution medium in accordance with a difference in a length of the reinforcing-fiber substrate positioned between a resin impregnation initiation part and a resin impregnation completion part, wherein a portion of the resin distribution medium higher in flowability is disposed adjacent a portion of the reinforcing-fiber substrate having a longer length of flow distance and a portion of the resin distribution medium lower in flowability is disposed adjacent a portion of the reinforcing-fiber substrate having a shorter length of flow distance.

* * * * *